United States Patent
Kamigama et al.

(10) Patent No.: US 6,859,995 B2
(45) Date of Patent: Mar. 1, 2005

(54) UNIVERSAL FIXTURE FOR HSA ASSEMBLY AND ITS TESTING PROCESS

(75) Inventors: Takehiro Kamigama, Kowloon (HK); Huegung Wang, Tai Po (HK); Yiusing Ho, Shatin (HK); Chunkau Leung, Kwai Chung (HK); Waikong Cheung, Yuen Long (HK); Shinji Misawa, Kowloon (HK); Jinsuo Sun, Dongguan (CN); Wenxin Chang, Dongguan (CN)

(73) Assignee: Sae Magnetics (H.K.) Ltd., Kwai Chung (HK)

( * ) Notice: Subject to any disclaimer, the term of this patent is extended or adjusted under 35 U.S.C. 154(b) by 0 days.

(21) Appl. No.: 10/294,977

(22) Filed: Nov. 13, 2002

(65) Prior Publication Data

US 2003/0151876 A1 Aug. 14, 2003

(30) Foreign Application Priority Data

Nov. 13, 2001 (CN) ................. PCT/CN01/01550

(51) Int. Cl.$^7$ ................. G11B 5/127; H04R 31/00
(52) U.S. Cl. ................. 29/603.01; 29/603; 29/742; 29/760; 29/761; 360/264.4; 360/265.2; 360/266.3; 361/200
(58) Field of Search .............. 29/603.01, 603, 29/742, 760, 761; 361/200; 360/264.4, 265.2, 266.3

(56) References Cited

U.S. PATENT DOCUMENTS

| 5,265,325 | A | * | 11/1993 | Fortin | 29/742 |
| 5,637,807 | A | * | 6/1997 | Kliewer et al. | 73/862.541 |
| 5,805,386 | A | | 9/1998 | Faris | 360/106 |
| 6,295,723 | B1 | * | 10/2001 | Coon | 29/760 |
| 2002/0181161 | A1 | * | 12/2002 | Buske et al. | 360/266.3 |

FOREIGN PATENT DOCUMENTS

WO    WO 97/26654    7/1997    ........... G11B/17/02

* cited by examiner

*Primary Examiner*—Carl J. Arbes
*Assistant Examiner*—Tim Phan
(74) *Attorney, Agent, or Firm*—Kenyon & Kenyon

(57) ABSTRACT

A new fixture which is capable of holding an HSA throughout all processes is invented so that Quasi-Static Test can be done before swaging. Handling operations are reduced and rework is made much easier. The invention further provides a process for testing the HSA by means of the fixture.

3 Claims, 8 Drawing Sheets

Fig.8 Comparison of Rework Process

UNIVERSAL FIXTURE FOR HSA ASSEMBLY AND ITS TESTING PROCESS

CROSS REFERENCE TO RELATED DOCUMENTS

The present application claims the benefit of CHINA PCT/CH01/01550 filed Nov. 13, 2001, which is hereby incorporated by reference herein in its entirety.

FIELD OF THE INVENTION

The present invention generally relates to a fixture for a hard disk drive, and specifically, to a universal fixture for a head stack assembly (HSA) in the hard disk driver used in a computer, and to a process for testing both wire and wireless types of HSA products in hard disk drive industry by means of the universal fixture.

BACKGROUND OF THE INVENTION

Typically, a disk drive comprises one or more magnetic disks having magnetic surfaces for data storage. The disks are mounted on a spindle and continually rotated at a substantially constant speed. A plurality of head arm assemblies are arranged together in a stacked assembly resembling a comb-type structure. The main body of the HSA is an electromagnetic actuator which is controlled by a head positioning system. The actuator positions the magnetic heads or transducers to preselected concentric recording tracks under the control of an address signal supplied to the actuator from a data processing system.

Each transducer, or head, glides over the disk surface by a film of air created by the disk as it is rotated. This type of head as designated by numeral 101 in FIG. 1 is classified as "an air bearing head" and is attached to a flexible sheet metal member 102 by means of a gimbal type mounting. The pre-formed sheet metal, which is called load beam, is made of stainless steel and is connected to a nut plate 103 with laser welds. A combination of "load beam", "gimbal type structure" and "air bearing head" is called Head Gimbal Assembly (HGA) 1. The HGA 1 is swaged to an actuator 2 comprising a body 201 on which a bearing 204 is mounted, a voice coil 202 arranged between two legs 205 of the body 201 and a number of arm fingers 203 extending from the body (FIGS. 2A and 2B). The head 101 is allowed to be biased toward the magnetic surface of the rotating disk for accessing the stored data.

The transducer is supplied with data signals during the recording mode of the disk drive. During reading of the recorded data, the transducer senses the magnetic transitions recorded on the disk representing the data. Each disk surface is associated with one HGA which, after being stacked up onto the actuator, forms a comb-type structure having the transducers at the distal ends of the HGAs with accurate vertical alignment. The complete assembly of HGAs with an actuator is called an HSA 3 (FIG. 2B) which is controlled to move over a corresponding path inside the hard disk drive.

In addition, the individual components on the HGA become more fragile and are easily damaged if extreme care is not exercised during each of the assembly operations. A head arm assembly operation generally comprises joining together a relatively stiff element and a relatively flexible element by a swaging operation. A head gimbal assembly (HGA) 1 comprises a magnetic transducer and a grimbal type mount attached to the distal end of the flexible element, usually by spot welding. The other end of the flexible element has a nut plate welded to the stiff element. The nut plate includes a cylindrical boss which extends normal to the flat surface of the plate and is designed to mate with an opening disposed in the end section of the rigid element. The elements are aligned precisely and spot welded to maintain their alignment during the subsequent swaging operation. The swaging operation as shown in FIG. 3 involves a series of steps in which a ball 32 slightly larger than the opening in a cylindrical boss 31 (not precisely scaled) is forced through the boss 31 thereby cold forming the boss material to the area of the rigid element surrounding the boss. This swaging operation has become the most critical step in the manufacturing process as the size of the components has decreased and their fragility has increased. The biasing force for the magnetic transducer is provided in the flexible elements by bending the flexible element along a line perpendicular to the lengthwise axis of the arm and subsequently returning the element to its original position while simultaneously stress relieving the bend area by heating it with a laser until the desired gram load force is obtained. The required gram load is determined by the flying characteristics of the transducer relative to the magnetic surface.

Assembly operations of the HSA involve providing a guide means, such as a guide hole, in the actuator end of the head aim. Each HGA is sequentially placed on a shaft with suitable ring type spacers between each arm. Each am is affixed to the shaft by ball swaging or adhesive.

The HSA is provided with a shipping comb which functions to maintain the adjacent head arms spaced apart a predetermined distance while the HSA is being tested before installation in the disk drive. The shipping comb is arranged to pivot out of position during the gram load measuring operation to permit each head to apply a force to a sensing device that measures and displays the value of the gram load of that head to the operator.

After positioning the HSA on a platform, the operator moves the platform to the measurement position. The heads are measured one at a time. For example, where the HSA includes four heads, four separate sensing devices are provided so that the operator is advised if any head is out of specification.

With the decrease in size, the head arms become less sturdy and hence are more sensitive to the swaging operation with the result that the alignment of the heads may be adversely affected. Further, if an HGA arm proves, on testing of the head stack, to be out of specification for the gram load, the possibility of manually adjusting the flexible element to obtain the correct biasing force is almost impossible.

The rework operation to replace the HGA having the incorrect gram load with a new head, or to at least salvage the good head arms, (usually 3 arms) was very complicated due to the swaging construction and the more fragile nature of the smaller components.

A conventional HSA assembly process in whcich quasi static testing (QST) can only be done after swaging and the rework process always requires de-swaging when HGA needs to be removed. This type of rework process is always time consuming, deforms the actuator, creates tremendous amount of particles and damages other quality HGA as well.

In order to overcome these problems, an HGA out of specification has to be identified before being swaged tightly to the actuator. It means that QST has done preferably before swaging so that the HGA out of specification can be replaced without going through the de-swaging process.

Consequently, a universal fixture is needed to hold HGAs in place while an HSA is being processed through various assembling and testing operations.

SUMMARY OF THE INVENTION

One object of the present invention is to provide a universal fixture for an HSA assembly.

Another object of the present invention is to provide a process for testing the HSA assembly by means of the universal fixture.

The universal fixture is structured in such a way that it can carry the HSA throughout all processes, including HGA auto-loading, bonding, QST and swaging. Some parts of the fixture are made of either ceramics or non-magnetic materials so that the QST of the HSA can be done with the fixture prior to HGAs being swaged tightly to an actuator.

If an HSA fails the test, one HGA out of specification can be replaced immediately in-line with another HGA of the same type, and an HSA which passes the QST can be proceeded to swaging.

Having employed the universal fixture in accordance with the present invention, the yield of the HGA can be improved by 10%. A minimum space is needed for rework of an HSA failed in the QST, and process looping time for the rework cycle is reduced significantly from a half day to only 2 minutes.

BRIEF DESCRIPTION OF THE DRAWINGS

The present invention will be described in greater details with reference to the drawings, in which.

DETAILED DESCRIPTION

The present invention will be better understood by reading the preferred embodiments of the invention with reference to the drawings.

Figure 1:
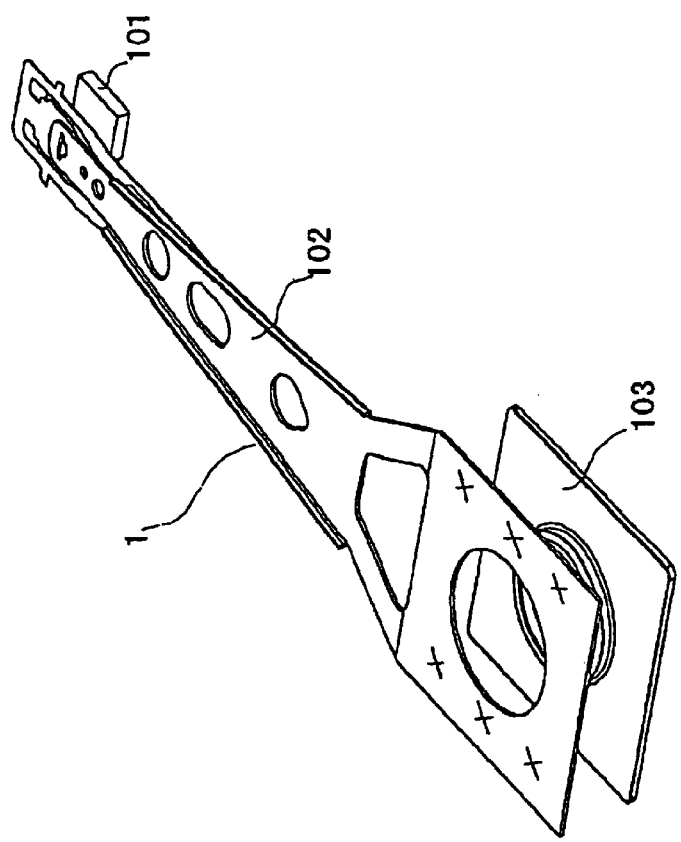
FIG. 1 is a perspective view of an HGA.
Figure 2A:
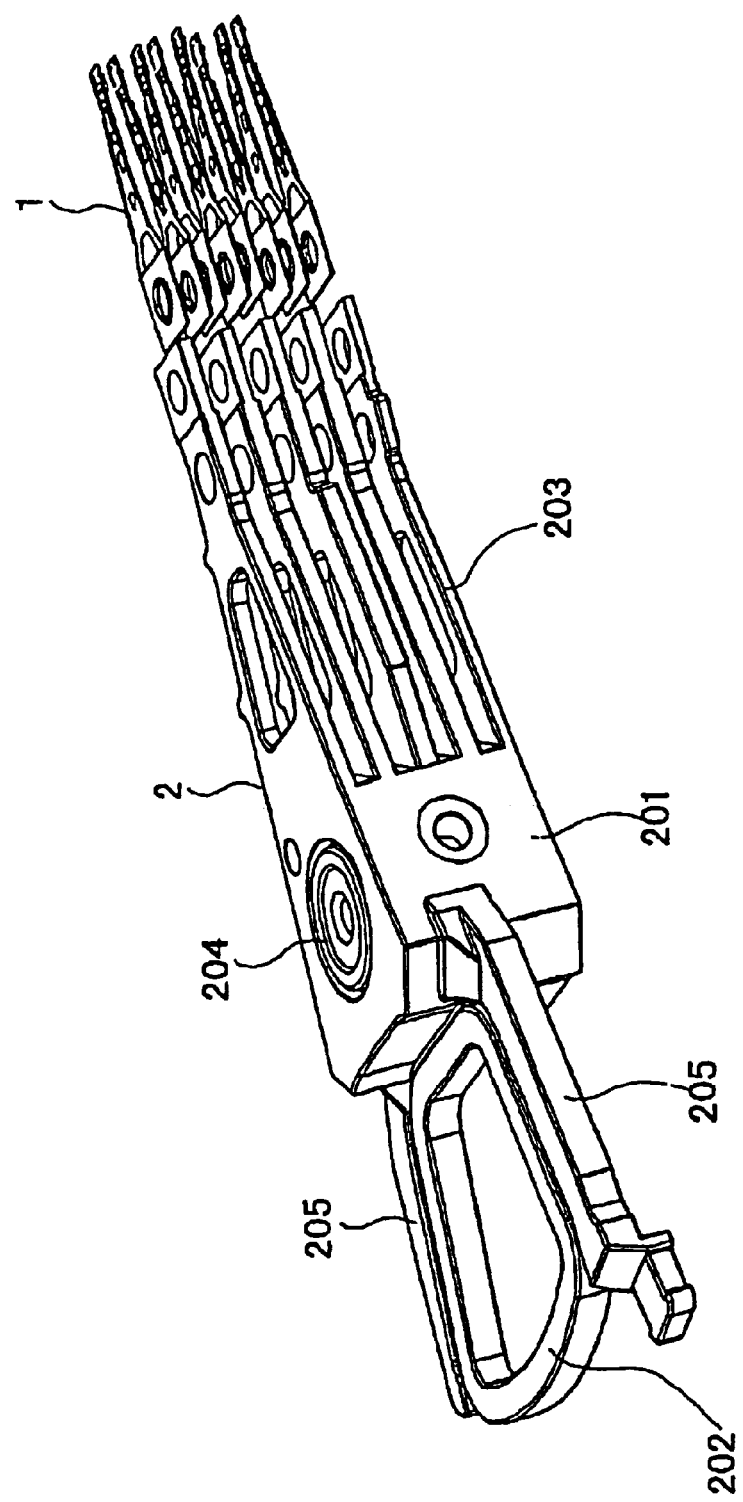
FIG. 2A is a perspective view of an HGA and an actuator before their assembling.
Figure 2B:
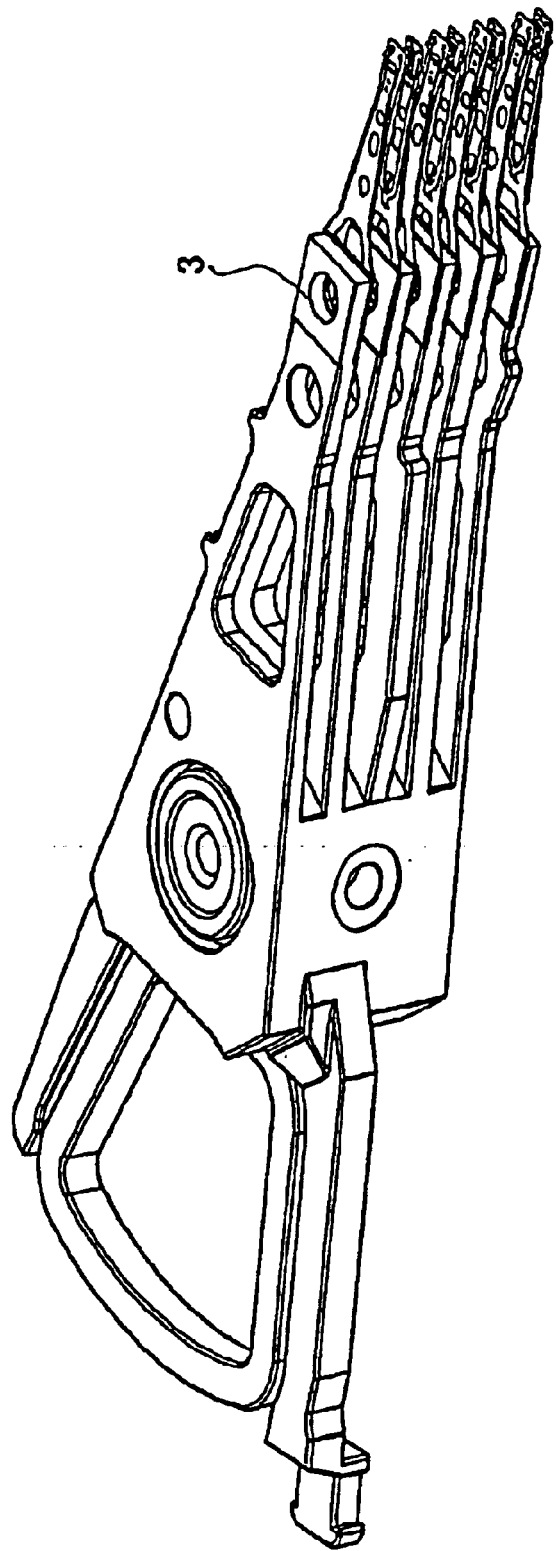
FIG. 2B is a perspective view of an HGA and an actuator after their assembling.
Figure 3:
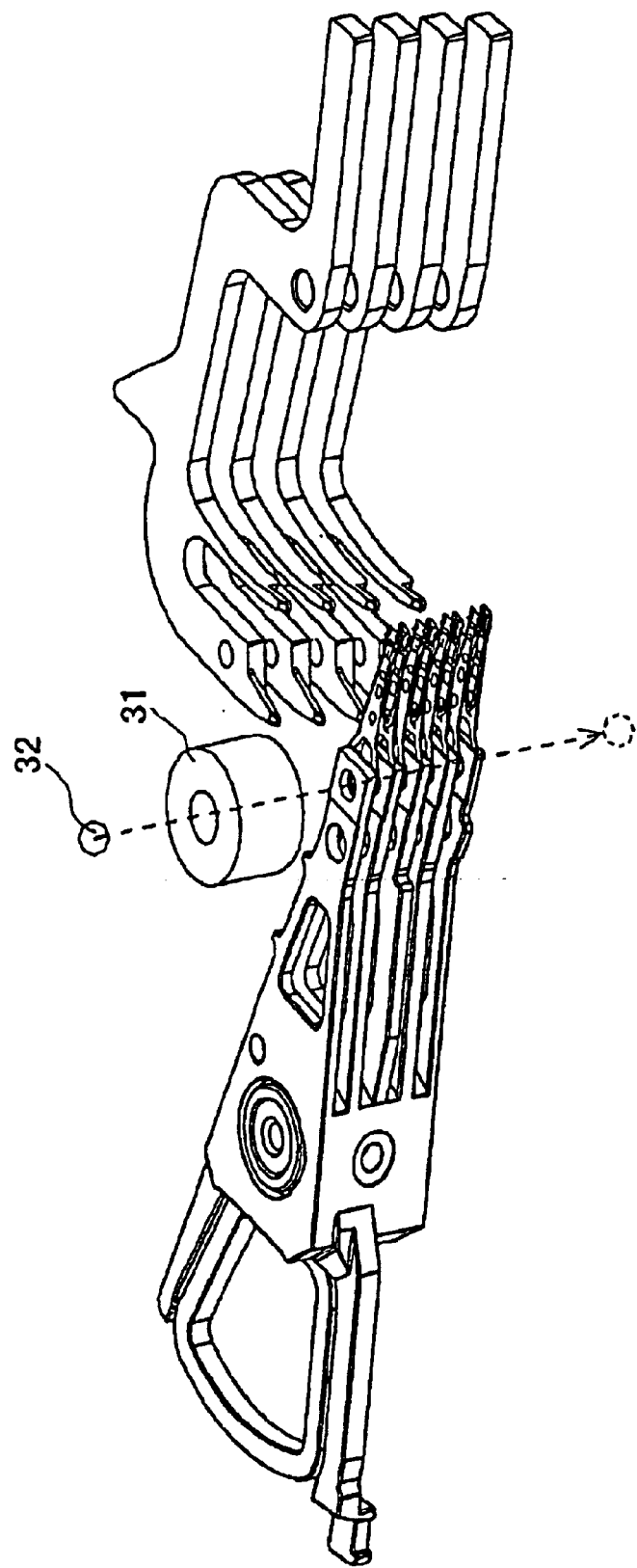
FIG. 3 is a diagram showing a swage operation of an HSA.
Figure 4:
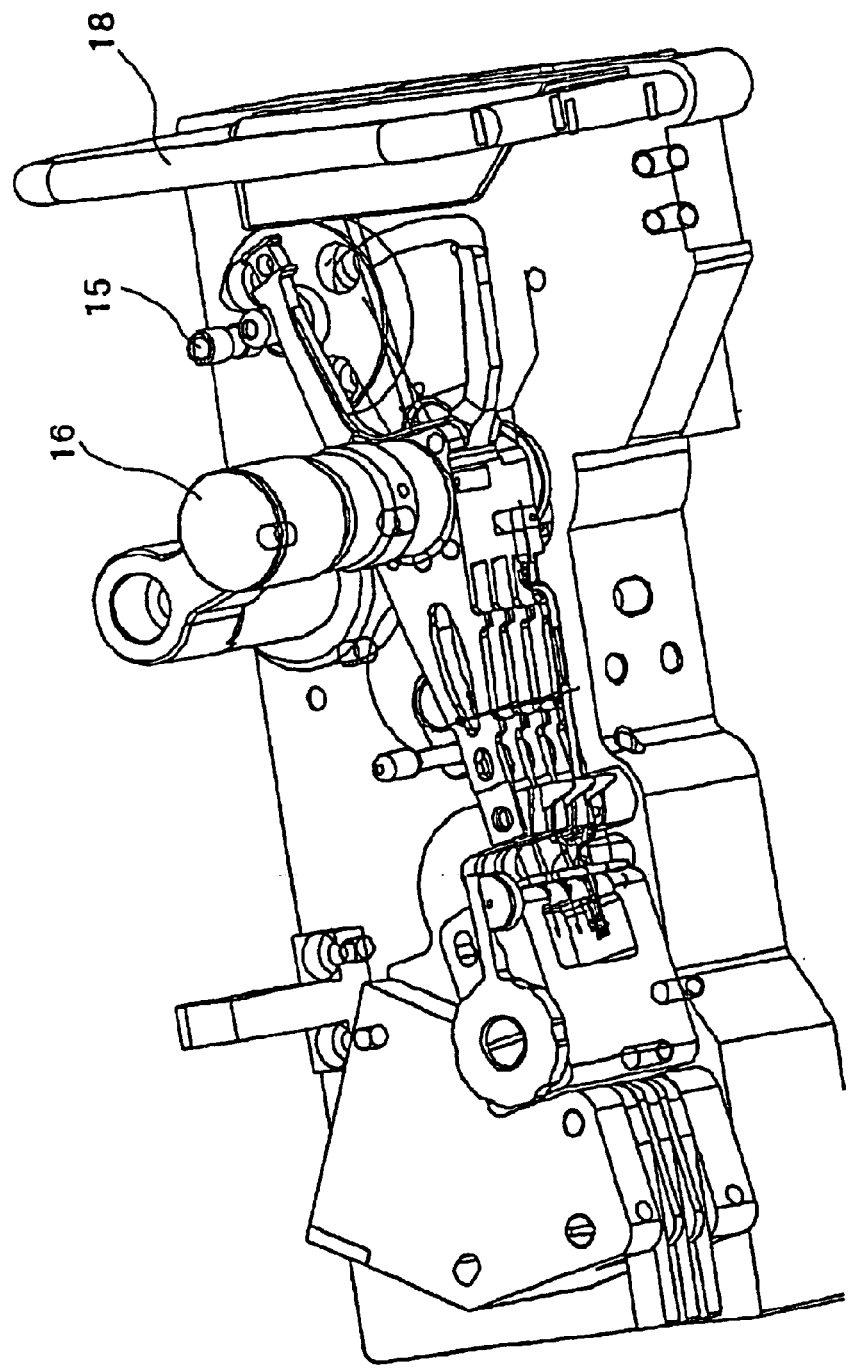
FIG. 4 is a perspective view of a universal fixture of the present invention with an HGA fitted to a respective arm finger of an actuator.
Figure 5:
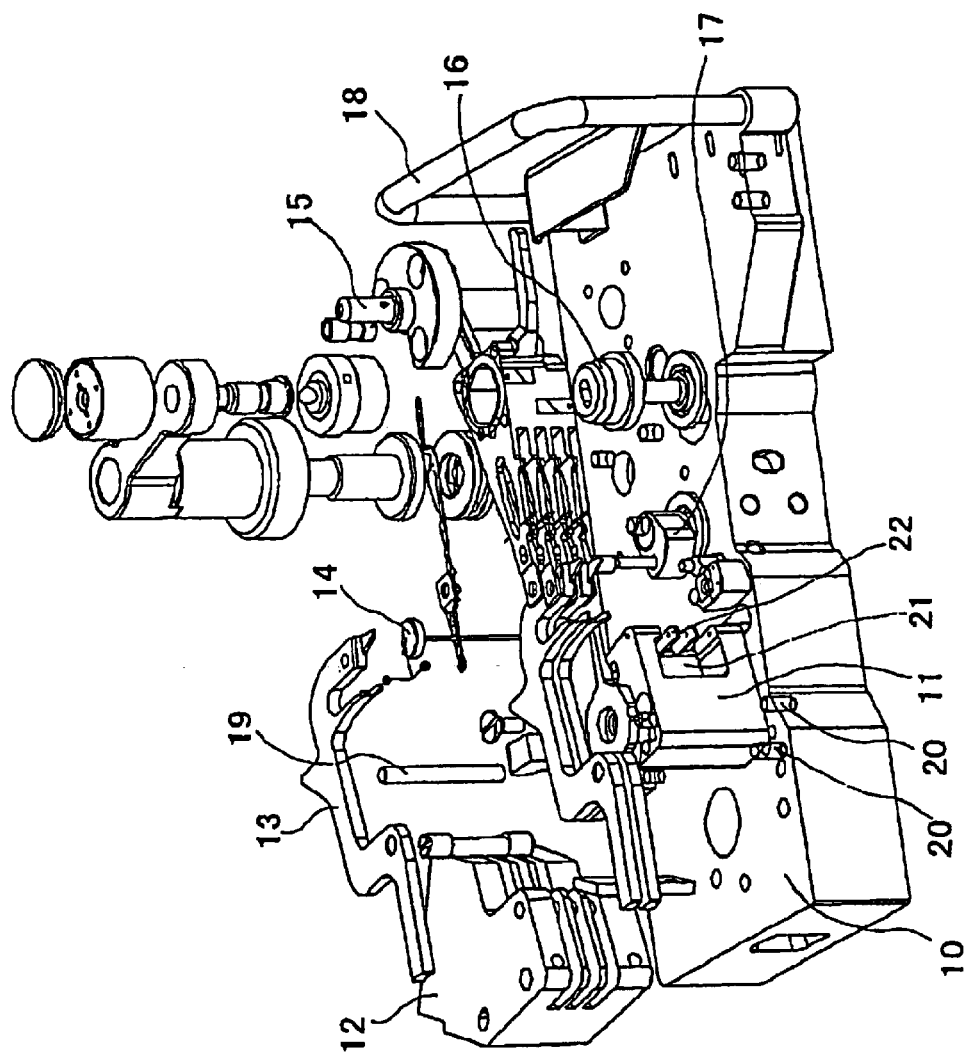
FIG. 5 is an exploded view of a universal fixture of the present invention.

FIG. 4 is a perspective view of a universal fixture of the present invention with an HGA fitted to a respective actuator, and FIG. 5 is an exploded view of the universal fixture of the present invention. As shown in FIGS. 4 and 5, the universal fixture for an HSA assembly according to the present invention comprises a platform 10 made of stainless steel, on which provided are an alignment pin holder 11, a wedge holder 12, a set of wedge plates 13 made of ceramic or non-magnetic materials for holding HGA's, an alignment pin 14 for aligning each HGA by passing through an aperture in the load beam of the HGA, an alignment datum pin 15 for limiting rotational stroke of the actuator, a datum pin 16 passing through an bearing opening of an actuator for fixing rotationally the actuator, an AFA clamper 17 for clamping an AFA (arm finger of actuator) and a handle 18 fixed at one end of the platform 10. The wedge holder 12 is mounted onto the platform 10 by means of screws, and is provided with several parallel horizontal slots the number of which correspond to that of the wedge plates 13 so that these parallel horizontal slots can receive respective wedge plates 13 when they are fitted separately and rotationally into the wedge holder 12 by means of a shaft 19, as shown in FIG. 5. One of the free ends of each wedge plate 13 is of an "F" shaped fork, and of two parallel arms of the fork, a farther arm of the fork is wider than a nearer arm. In the wider arm provided is an opening whose diameter corresponds to that of the swaging opening of the nut plate of the HGA. The end of each of the two arms is partly cut off so that a thin tip is formed on one side at the end of each arm. The alignment pin holder 11 is mounted onto the platform 10 by means of a few pins 20, and part of the alignment pin holder 11 is cut off so that a rectangular recess 21 is formed in the alignment pin holder 11. On one of vertical walls of the rectangular recess 21 there are provided with a few webs 22, the number of which also correspond to that of the wedge plates 13. At the distal end of each web 13 formed is an aperture whose inner diameter is slightly larger than the diameter of the alignment pin 14 so that the alignment pin 14 can freely pass through the aperture. The datum pin 16 consist of two parts that are sized so that they can extend partly and oppositely into the bearing hole of an actuator.

During the in-line process of HGAs, an actuator is fixed to the universal fixture by the datum pin 16, and the opening of each arm finger of the actuator is aligned with that of respective wedge plates 13. A plurality of HGAs the number of which corresponds to that of the arm fingers of the actuator are loaded onto the universal fixture by means of the wedge plates 13 and the webs 22. The universal fixture of the present invention is structured in such a way that it can carry the HSA throughout all processes, including auto-loading, bonding, quasi static testing and swaging, and the quasi static test of the HSA can be done with the fixture prior to the HGA being swaged tightly to an actuator.

Figure 6:
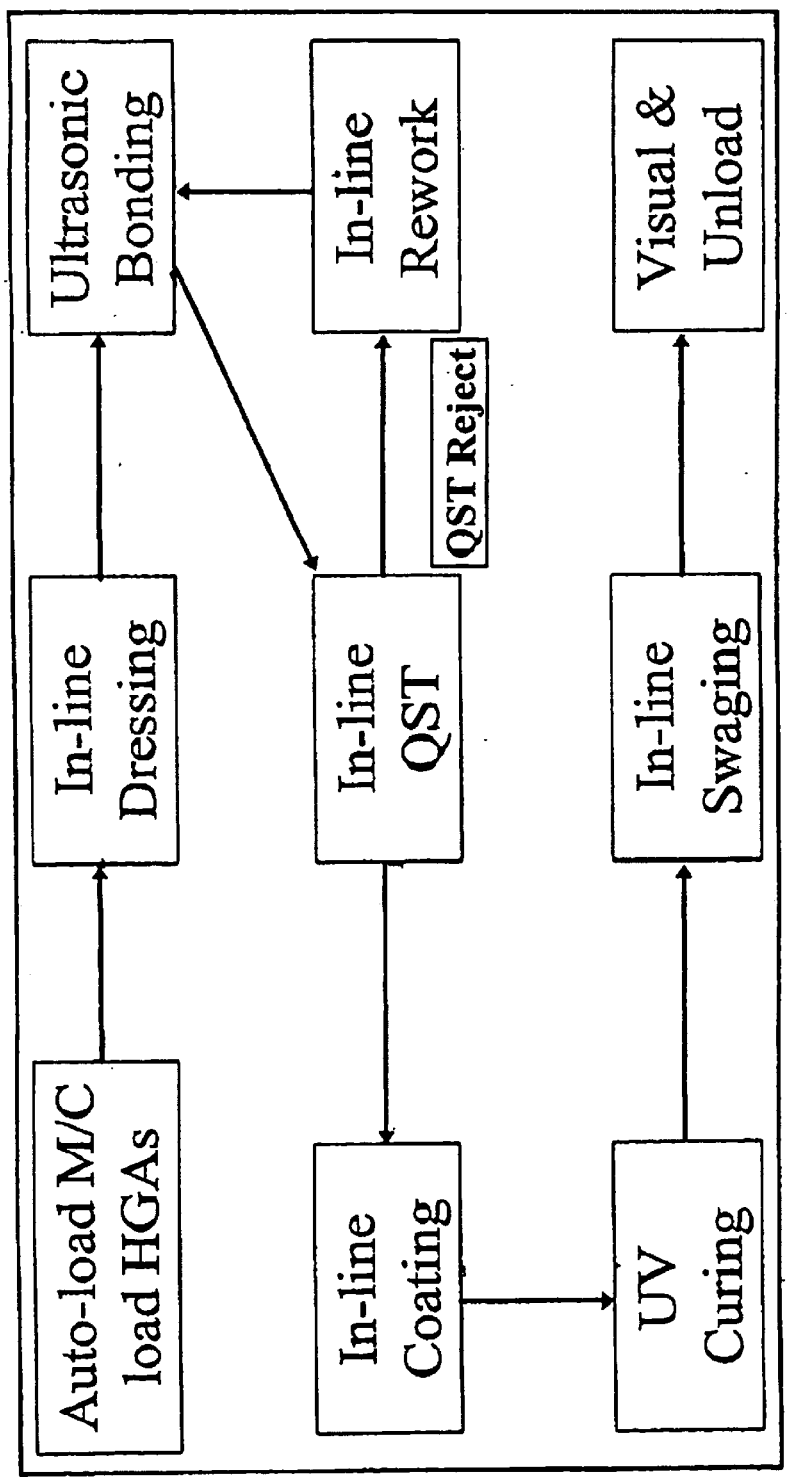
FIG. 6 is a flow-chart of the HSA assembling process in accordance with the present invention.

An in-line process of an HGA by the universal fixture of the present invention will be explained with reference to FIG. 6. This in-line process generally comprises following steps:

Auto-loading the machine by loading HGAs and an actuator;

In-line dressing;

Ultrasonic Bonding;

In-line quasi static testing of HGAs;

If an HGA fails to pass the testing, it will be rejected and in-line reworked;

In-line coating;

Ultra-voice curing;

In-line swaging of the HGAs and actuator to form an HSA; and visual checking and unloading of the HSA.

In the in-line process of the invention, since the wedge plates 13 of the fixture can operated independently each other, if an HSA fails the quasi static test, a failing HGA can be replaced in-line immediately and the same HSA can be retested again. Only quality HSAs which pass the quasi static test can be proceeded to swaging.

Figure 7:
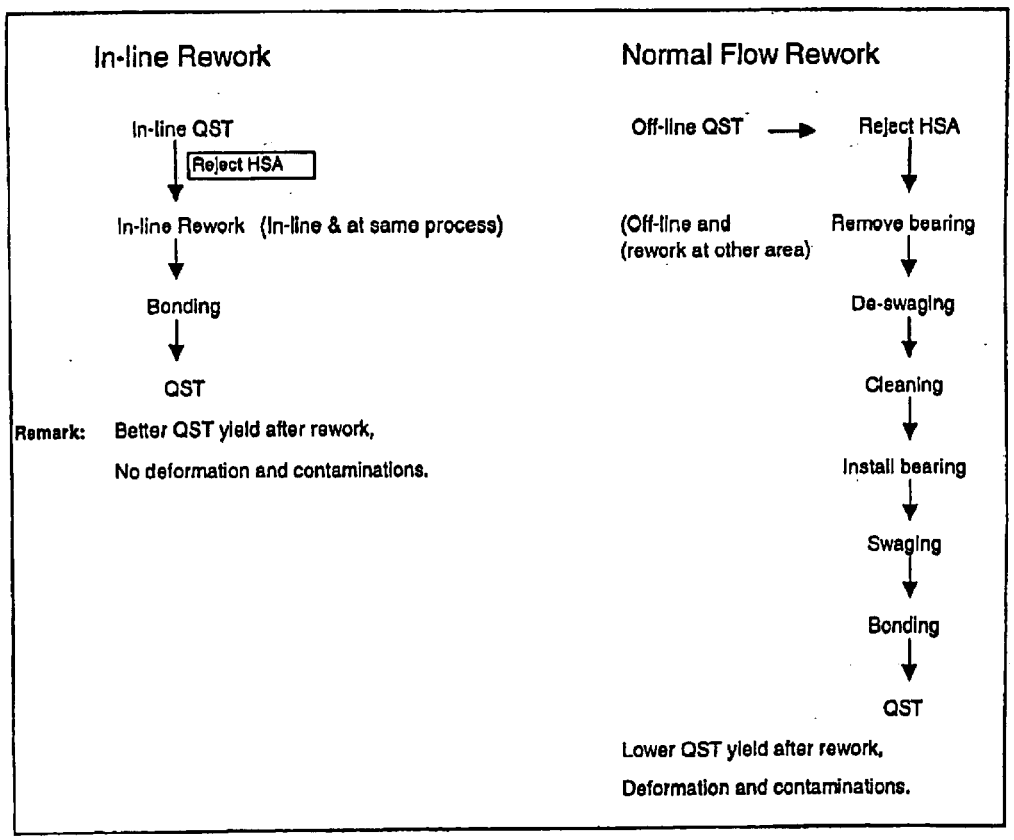
FIG. 7 shows a comparison of the rework process of the present invention with that of the prior art.

FIG. 7 shows a comparison of the rework process of the present invention with that of the prior art. As shown in FIG. 7, the prior normal flow rework process comprises steps: off-line quasi static test of an HSA; rejection of an failing HSA; remove of a bearing; de-swage of the HSA; cleaning of the de-swaged HSA; installation of the bearing; swage of the HSA; bonding of HGAs; and quasi static test of the HSA again. Consequently, the process of the prior art has a lower QST yield after rework with deformation and contamination of the HSA.

In contrast, the in-line rework process of the present invention comprises only steps: in-line quasi static test of an HSA; in-line rework of the failing HSA; bonding HGAs; and quasi static test of the HSA again. Consequently, the process of the present invention has a better QST yield after rework without deformation and contamination of the HSA.

It will be understood that the invention is not restricted to the aforedescribed and illustrated exemplifying embodiments thereof and that modifications can be made within the scope of the inventive concept defined in the following claims.

What is claimed is:

1. A universal fixture for head stack assembly comprising:
   a platform made of stainless steel;
   an alignment pin holder on said platform which is provided for holding an alignment pin for fixing all head gimbal assemblies;
   a wedge holder mounted on said platform;
   a set of wedge plates fixed separately in said wedge holder so as to allow for rotational movement in order to hold said respective head gimbal assemblies;
   a datum pin for fitting to a bearing of an actuator;
   an alignment datum pin for limiting stroke of said actuator; and
   an arm finger of actuator clamper for clamping respective arm fingers of said actuator.

2. A universal fixture for a head stack assembly according to claim 1, wherein said wedge plate is made of ceramic.

3. A universal fixture for a head stack assembly according to claim 1, wherein said wedge plate is made of non-magnetic materials.

* * * * *

UNITED STATES PATENT AND TRADEMARK OFFICE
CERTIFICATE OF CORRECTION

PATENT NO. : 6,859,995 B2
DATED : March 1, 2005
INVENTOR(S) : Takehiro Kamigama et al.

It is certified that error appears in the above-identified patent and that said Letters Patent is hereby corrected as shown below:

Title page,
Item [73], Assignee, "Sae Magnetics (H.K.) Ltd." should be -- SAE Magnetics (H.K.) Ltd. --;

Column 2,
Lines 54-55, "whcich quasi static" should be -- which quasi-static --;

Column 4,
Line 53, "Ultra-voice" should be -- Ultra-violet --.

Signed and Sealed this

Twenty-eighth Day of February, 2006

JON W. DUDAS
*Director of the United States Patent and Trademark Office*